March 5, 1940.  J. J. JAKOSKY  2,192,404

METHOD AND APPARATUS FOR ELECTRICAL EXPLORATION OF THE SUBSURFACE

Filed Oct. 30, 1937   3 Sheets-Sheet 1

INVENTOR.
JOHN JAY JAKOSKY,
BY
ATTORNEYS.

March 5, 1940. J. J. JAKOSKY 2,192,404
METHOD AND APPARATUS FOR ELECTRICAL EXPLORATION OF THE SUBSURFACE
Filed Oct. 30, 1937 3 Sheets-Sheet 3
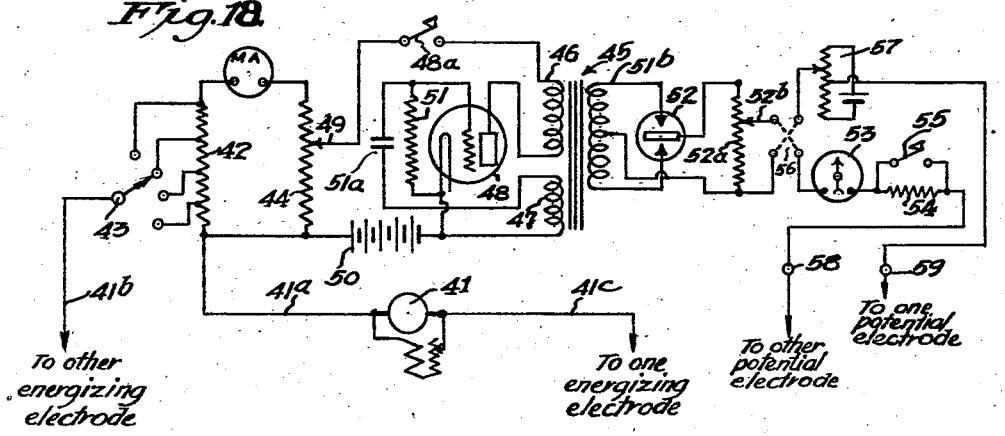
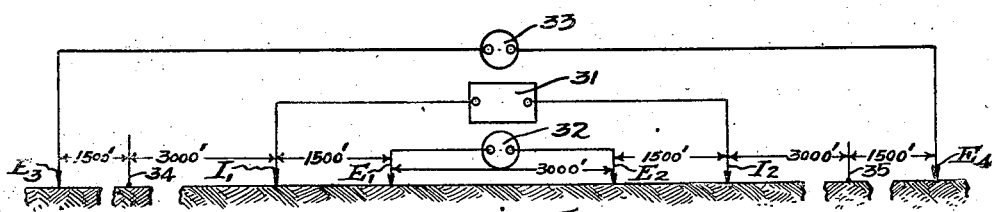
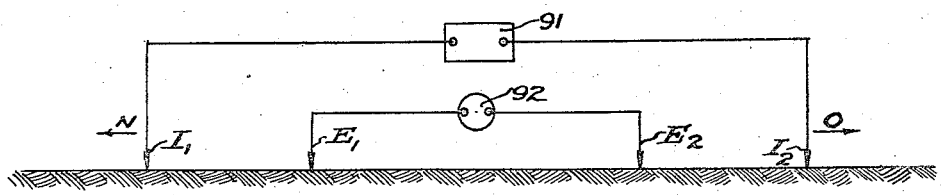
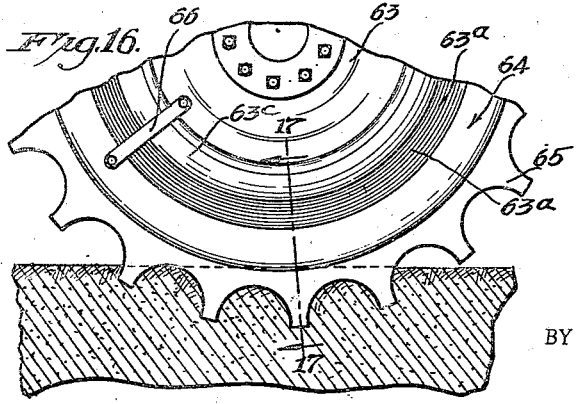
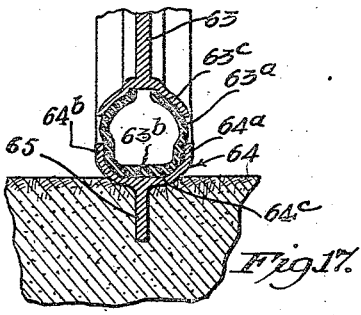
INVENTOR.
JOHN JAY JAKOSKY,
BY
ATTORNEYS.

Patented Mar. 5, 1940

2,192,404

UNITED STATES PATENT OFFICE 2,192,404

METHOD AND APPARATUS FOR ELECTRICAL EXPLORATION OF THE SUBSURFACE

John Jay Jakosky, Los Angeles, Calif.

Application October 30, 1937, Serial No. 172,009

15 Claims. (Cl. 175—182)

This invention relates to geophysical exploration and pertains more particularly to an improved electrical method and apparatus for determining the geologic nature and characteristics of the subsurface.

A general object of the invention is to provide a method for electrical exploration of the subsurface by which surveys may be conducted more rapidly and accurately than with previous methods, and an apparatus for use therewith.

One of the principal objects of the invention is to provide a method for determining inhomogeneities in the subsurface at different depths, in which errors due to near-surface inhomogeneities at different positions in the region under exploration are substantially eliminated or minimized.

Another object of the invention is to provide a method and apparatus for the electrical exploration of the subsurface in which variations in the measurements result primarily from the effects of the deeper-lying structures of economic importance.

Another object of the invention is to provide a method for electrical exploration of the subsurface which eliminates or minimizes the errors resulting from natural earth currents.

Another important object of the invention is to provide a method and apparatus for the electrical exploration of the subsurface which produces great economies in the time, labor, and number of operators required to conduct a given survey.

Another important object of the invention is to provide a method and apparatus for the electrical exploration of the subsurface which, in the simplest embodiment thereof, requires the movement of only a single electrode for a series of successive measurements.

A further object is to provide an advantageous method and apparatus which may be used for electrically ascertaining inhomogeneities in the subsurface at different depths, electrical inhomogeneities at different lateral positions, locations and types of sloping contacts, and the general non-symmetry of the subsurface.

Another object of the invention is to provide an electrical method and apparatus by which faults and contacts of the subsurface may be quickly and accurately located.

Another object of the invention is to provide a method for the electrical exploration of the subsurface which may be advantageously practiced with energizing electrodes which are moved or are capable of continuous movement over the surface of the earth and which maintain electrical contact with the surface of the earth during such movement.

A further object of the invention is to provide an apparatus for measuring the relation of an energizing current to the potential created between spaced points on the earth's surface by such current, which is simple and inexpensive of construction and provides complete isolation of the potential and energizing circuits.

Another object of the invention is to provide an advantageous mobile electrode device having a contact element which may be removed to provide better portability to the device.

Further objects and advantages of the invention will be more specifically brought out in the following description or will be apparent therefrom.

According to this invention, an electric current is passed through the earth between a pair of energizing electrodes which are electrically connected to the earth and are spaced from one another by a known distance along the earth's surface. The flow of electric current through the earth creates another quantity at a substantially fixed position on the earth's surface, which quantity will tend to vary as the path of the current through the earth is repeatedly varied by repeatedly changing the position of at least one of the electrodes and passing current through the earth between these electrodes for each of the successive positions thereof. A series of measurements are taken, while the current is flowing through the successive paths, which are indicative of the effect of variations in the subsurface upon the value of the created quantity at the fixed position as the path of current is varied. A multiplicity of such measurements are taken, involving the value of such created quantity at the fixed position for a multiplicity of different paths of the current flow.

The quantity created at the fixed position and employed for the purpose of obtaining the desired series of measurements may be, for example, a potential difference between two fixed electrodes, or a magnetic field at a fixed position, or any other quantity whose value is influenced by variations in the path of current and by variations in the subsurface traversed by the current. In some embodiments of the invention, this created quantity may be considered as the ratio of two potential values or of two magnetic field values.

The quantity measured for each of the successive positions of the energizing electrodes may be any quantity whose value, for each such position, is dependent upon the effect of variations in the subsurface on the quantity created at the fixed position. This quantity may involve the potential or the magnetic or electromagnetic field, created at one or more fixed positions on the earth's surface, or it may involve the ratio of electric and magnetic quantities or of two electric or two magnetic quantities. As will be more readily apparent from the following description of certain embodiments of the invention, the quantity which is measured may be the quantity created at the fixed position; or it may be a quantity indicative of the relative values of the energizing current and the created quantity at the fixed position, such as the value of the created quantity for a known value of current, the value of the current for a known value of the created quantity, or the ratio of the current to the created quantity.

Also, by the use of suitable energizing and measuring apparatus, such as known in the art, other variables, such as phase shift between current and potential, may be measured, and it will be understood that the invention is applicable to procedures involving the measurement of any quantity which is influenced by variations in the subsurface traversed by the current as the path of current through the earth is varied by including different portions of the earth between the energizing electrodes.

The method of this invention may be practiced with either direct current or alternating current of high or low frequency, or with direct or alternating current impulses. The current passed through the earth between the energizing electrodes may be kept constant throughout a series of measurements at successively different positions of the energizing electrodes, and the potential or magnetic field strength or other quantity may be measured at a fixed position; or the current may be varied in any desired manner, for example, in proportion to the spacing between the energizing electrodes; or the current may be adjusted in each case to create a constant value of the quantity created at a fixed position throughout a series of measurements, and the current may be measured. When measurements are made involving the value of a created quantity at two fixed positions, they may be made simultaneously and averaged to eliminate errors due to natural earth currents, or the ratio or difference of these two quantities may be obtained, either from the two simultaneous measurements or directly by means of a suitable measuring device, so that the effect of natural earth currents may be minimized, and with some arrangements, eliminated.

The path of current flow through the earth between the energizing electrodes may be varied by varying the distance between the energizing electrodes to vary the effective depths of current penetration by moving one or both of the electrodes, or by maintaining a constant separation of the electrodes while moving one or both of the electrodes, to conduct a constant depth survey. The electrodes may be moved in the same or opposite directions over straight lines or other paths.

In each case the position or positions at which the created quantity used in the measurements is obtained remains fixed throughout a series of measurements, whereby the effect of near-surface inhomogeneities upon the values of the created quantity and also upon the resulting measurements are minimized or substantially eliminated as will be more fully explained hereinafter. Procedures in which measurements are taken involving variations in a quantity created at a fixed position by the flow of an energizing current as the path of such current is varied are disclosed in my copending applications Serial Nos. 112,747, filed November 25, 1936 and issued as Patent No. 2,105,247; 144,467, filed May 24, 1937; 145,795, filed June 1, 1937, and issued as Patent No. 2,167,950; and 146,781, filed June 7, 1937, and issued as Patent No. 2,137,650.

The accompanying drawings illustrate several different embodiments of the method and apparatus of the present invention, and referring thereto:

Figs. 14 and 15 are diagrammatic side elevations representative of apparatus arrangements in which both of the energizing electrodes may be moved to different locations on the earth's surface while the position of measurements is maintained substantially stationary;

Fig. 16 is a side elevation of a removable contact element according to my invention;

Fig. 17 is a transverse section thereof taken on line 17—17 in Fig. 16; and

Fig. 18 is a wiring diagram of a form of apparatus which I have found to be advantageous.

Figure 1:
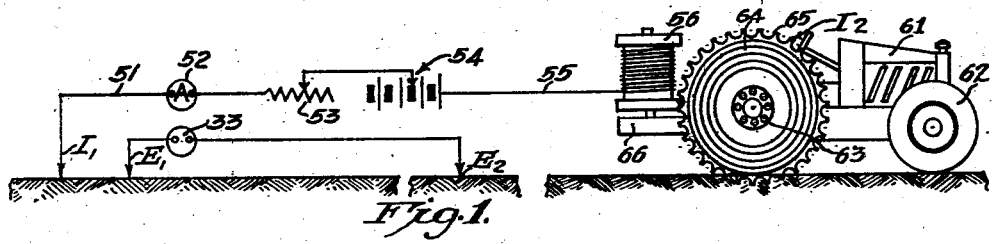
Fig. 1 is a diagrammatic side elevation of an apparatus arrangement according to this invention.

Referring particularly to Fig. 1, an energizing electrode is shown at $I_1$ and is connected through insulated conductor 51 to an ammeter indicated at 52, a variable resistor 53, and a variable potential source of power such as a plurality of battery cells indicated at 54. The battery 54 is connected through a second insulated conductor 55 to another energizing electrode $I_2$. The electrode $I_1$ is kept in a substantially fixed position throughout a series of measurements and may be of the conventional stake electrode type. The electrode $I_2$ is movable to different positions, and is shown as comprising a mobile electrode device indicated at 61. The electrode device may be of any of the types described in my above-mentioned copending application Serial No. 112,747, now Patent No. 2,105,247, filed November 25, 1936, such as the tractor shown herein, and it may be capable of movement or of being moved over the surface of the earth while maintaining continuous electrical contact with the earth's surface during such movement.

The tractor 61 may be of the more or less conventional four-wheeled type provided with pneumatic front tires indicated at 62 and with the customary large diameter rear wheels 63 which are preferably provided with demountable metal rims 64 carrying earth-engaging protuberances or tread members 65. Suitable connection is provided between the cable 55 and the metal rims 64 and protuberances 65 so that electrical connection between the earth and the cable may be maintained during movement of the electrode $I_2$. A cable reel 56 for storing the cable 55 is shown mounted on a platform 66 provided on the tractor 61.

The use of demountable metal rims such as will be described subsequently allows the interchangeable use of the spiked wheels which may be used during a survey and pneumatic tires which may be used for traveling on highways or other places where speed is a factor.

Potential electrodes $E_1$ and $E_2$ are shown located adjacent electrodes $I_1$ and $I_2$ respectively, and may, for example, be spaced from the respective electrodes $I_1$ and $I_2$ by a distance on the order of one-tenth to one-third the minimum distance between the electrodes $I_1$ and $I_2$. If desired, however, the two potential electrodes may both be located close to the fixed energizing electrode $I_1$. A potential measuring device 33 is shown connected between the potential electrodes $E_1$ and $E_2$ so that the potential created between the electrodes $E_1$ and $E_2$ may be recorded, for the various positions of the electrodes $I_1$ and $I_2$.

Figure 2:
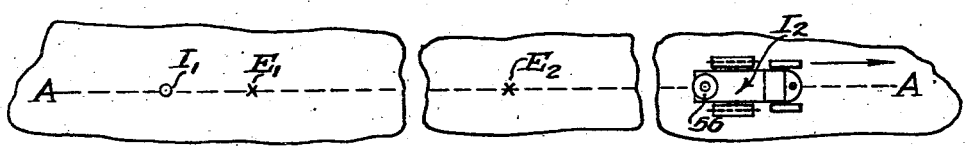
Fig. 2 is a diagrammatic plan view thereof.

Referring to Fig. 2, the electrode arrangement of Fig. 1 is indicated in plan view and it will be seen that the electrodes $I_1$, $E_1$, $E_2$, and $I_2$ are spaced from one another along the earth's surface. According to the preferred arrangement shown, these electrodes are all disposed substantially on a straight line A—A. The electrodes $I_1$ and $I_2$ are located at some initial separation and the electrodes $E_1$ and $E_2$ are placed in contact with the ground and connected to the measuring device 33. The current through the ammeter 52 is then adjusted to some initial value and the electrode $I_2$ is set in movement outwardly along the line A—A, for example, to the right of the electrode $I_1$, and a multiplicity of measurements are taken of potential, as indicated by device 33, at the fixed position defined by the electrodes $E_1$ and $E_2$, either continuously as the electrode $I_2$ is moved outwardly, or intermittently for a multiplicity of separations of the moving and stationary electrodes $I_2$ and $I_1$. The energizing electrode $I_1$ and the potential electrodes $E_1$ and $E_2$ are kept in substantially fixed positions throughout this multiplicity of measurements. The current flowing through the earth between $I_1$ and $I_2$ may be kept constant, or may be systematically varied as the spacing between $I_1$ and $I_2$ is increased or decreased. In either case, the potential measurements obtained are indicative of the effect of variations in the subsurface traversed by the current flowing between electrodes $I_1$ and $I_2$.

The conductor 55 is preferably carried on the reel 56 mounted on the mobile electrode device 61 so that the conductor will be unwound as the electrode $I_2$ moves over the earth, rather than dragged along the earth by the electrode $I_2$. As described in my copending application Serial No. 112,747, the distance traveled by the electrode $I_2$ may be made to produce indications at a point adjacent the potential measuring operator and the operator controlling the power supply, so as to provide a continuous indication of variations in the spacing between the energizing electrodes as the electrode $I_2$ travels outwardly.

Figure 3:
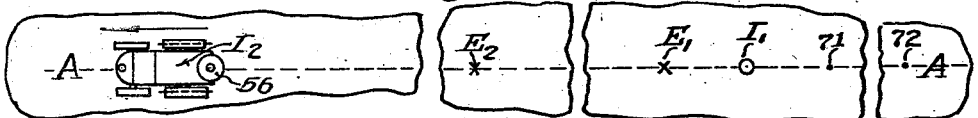
Fig. 3 is a view corresponding generally to Fig. 2, illustrating additional steps which may be utilized in conducting a survey according to my invention.

Pertinent information regarding the subsurface may be obtained from the values of current and the corresponding values of potential for a series of locations of the electrode $I_2$ as it moves outwardly on the line A—A. However, when using the above procedure I prefer to take at least one more series of measurements as the electrode $I_2$ is moved outwardly in a different direction from the fixed electrode $I_1$. Thus in Fig. 3 the line A—A is shown continued outwardly from the left of the electrode $I_1$ and the electrode $I_2$ is shown at a location on the line A—A to the left of the electrode $I_1$. Potential measurements may be taken with the potential electrodes at the same position as in Fig. 2 and this position is indicated by the points 71 and 72; however, it is possible to change the position of measurement by moving the potential electrodes $E_1$ and $E_2$ to the side of the electrode $I_1$ nearest the electrode $I_2$, as shown in Fig. 3, when taking measurements during travel of the electrode $I_2$ on the left side of $I_1$. This second set of measurements is then taken as the electrode $I_2$ repeatedly assumes different locations, preferably corresponding to the positions of said electrode in the first series of measurements.

Assuming now that the two sets of measurements, each comprising a multiplicity of measurements, have been obtained according to the procedures described in relation to Figs. 2 and 3, one set for each direction of movement of the electrode $I_2$, and that suitable mathematical corrections have been made to take care of electrode spacing and any dissymmetries in the electrode arrangements, two curves may then be plotted and averaged together after correlation to give an average curve indicative of the subsurface conditions in the region surveyed; or, the two curves obtained from the two sets of measurements may be otherwise correlated with one another or with curves from subsequent stations or may be separately interpreted. Since the two potential electrodes are stationary, the curves will be more or less constantly affected by the same near-surface conditions so that the predominant flexures on such curves will primarily result from subsurface variations at different relatively great depths, as the depth of penetration of the current is varied by repeatedly varying the spacing between the energizing electrodes.

Figure 4:
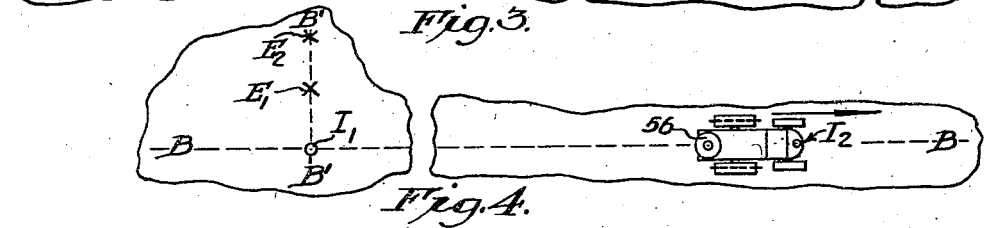
Figs. 4 through 9 are diagrammatic plan views illustrative of various electrode arrangements which may be utilized in conducting a survey according to my invention.

In Fig. 4 I have shown the energizing electrodes $I_1$ and $I_2$ on the straight line B—B. The electrode $I_1$ is shown as a stationary electrode and the electrode $I_2$ is represented as a mobile electrode. In this illustration the potential electrodes $E_1$ and $E_2$ are located closely adjacent the electrode $I_1$ and on a straight line B'—B' passing through the electrode $I_1$ and at right angles to the line B—B. The fixed position defined by the electrodes $E_1$ and $E_2$ is thus located to one side of the electrode $I_1$ and laterally removed from the line B—B. A survey may then be conducted in exactly the same manner as outlined in relation to Fig. 2 and a second survey may be conducted along the line B—B with the electrode $I_2$ moved to a multiplicity of different locations on the opposite side of the electrode $I_1$, without changing the position of the potential electrodes $E_1$ and $E_2$, which are symmetrically disposed with respect to the paths of movement of electrode $I_2$ at the right and left sides of electrode $I_1$. The two sets of data obtained when the electrode $I_2$ is moved in different directions relative to the electrode $I_1$ in Fig. 4 may be properly correlated and then averaged together to given an indication of the subsurface beneath the electrode $I_1$.

Figure 5:

In Fig. 5 I have shown a ground network arrangement whereby the errors due to natural earth currents of a regional character may be eliminated. In this figure the electrodes are arranged substantially along a straight line C—C' and the moving energizing electrode $I_2$ is shown to the right of a stationary energizing electrode $I_1$. In this instance potential electrodes $E_1$ and $E_2$ are shown to the right of electrode $I_1$ and potential electrodes $E_3$ and $E_4$ are shown to the left of electrode $I_1$, defining fixed positions to the right and left of the electrode $I_1$. Current is supplied to the earth between electrodes $I_1$ and $I_2$ and a multiplicity of potential measurements may be taken between $E_1$ and $E_2$ and between $E_3$ and $E_4$, preferably simultaneously, for different positions of the electrode $I_2$ as it moves to a multiplicity of positions along the line C—C. The potential readings taken between the respective pairs of potential electrodes, at each location of the moving electrode, may be divided to give the ratio of potentials or may be subtracted to give the difference in potentials, and the nature and characteristics of the subsurface between the electrodes $I_1$ and $I_2$ may be determined from the resulting data obtained.

However, I prefer in most cases to average the two measurements taken for each position of the moving energizing electrodes, when using two sets of potential electrodes arranged as in Fig. 5, and in such cases the distances between electrodes $E_1$—$E_2$ and $E_3$—$E_4$ should be equal or substantially so. Since the natural earth currents are regional in character and cover rather large areas they may be assumed to be substantially constant, in magnitude and direction, at any given time, over the total area included between the electrodes $E_4$ and $E_2$, so that the effects of the earth currents between $E_3$ and $E_4$ upon the measured values of potential will be substantially equal and opposite to the effects of the earth currents between $E_1$ and $E_2$, if measurements involving the two pairs of electrodes are taken simultaneously. Hence, the average values of the measurements so obtained for the successive positions of the moving energizing electrode are free from errors due to variations in natural earth currents.

Additional data may be obtained, if desired, by moving the electrode $I_2$ outwardly from the electrode $I_1$ in a different direction, while taking measurements between $E_1$—$E_2$ and $E_3$—$E_4$.

Figure 6:
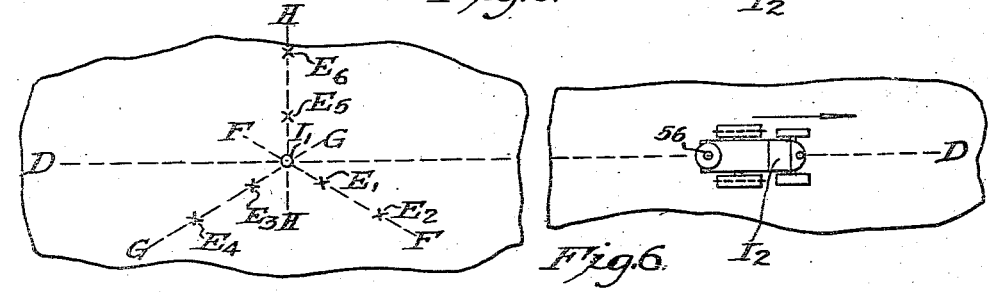

Another electrode arrangement which may be advantageously employed is illustrated in Fig. 6. With this arrangement measurements are taken which involve the created quantity, such as potential, at three positions which are symmetrically disposed with respect to the electrode $I_1$, for example, at the positions defined by electrodes $E_1$ and $E_2$; $E_3$ and $E_4$, and $E_5$ and $E_6$, located on lines F—F, G—G, and H—H respectively, which are 120° from one another. The electrode $I_2$ is shown located on a straight line D—D passing through the electrode $I_1$ which is preferably at right angles to one of the equally spaced lines, for example, the line H—H. Measurements involving the created potential at the three positions are preferably made simultaneously as the electrode $I_2$ is moved along the line D—D. It will be seen that the measurements taken when the electrode $I_2$ is on one side of the electrode $I_1$ may be correlated with measurements taken when the electrode $I_2$ is on the other side of $I_1$, as long as the electrode $I_2$ is moved along the line D—D, since the positions defined by the potential electrodes are symmetrically disposed with respect to one another and with respect to the line of survey. The measurements taken involving each of the three positions may be separately interpreted or may be correlated to provide information regarding the region undergoing survey.

Figure 7:
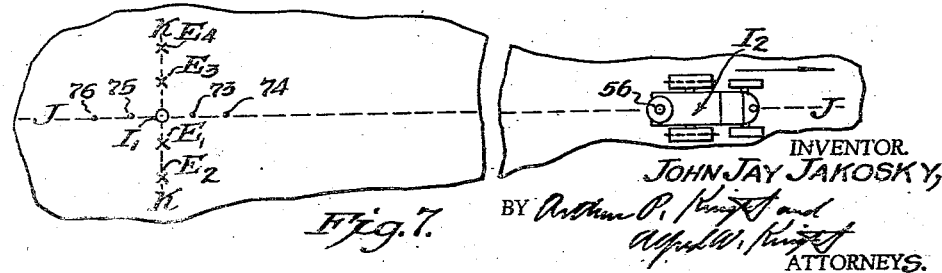

Another advantageous electrode arrangement is illustrated in Fig. 7 in which the energizing electrodes $I_1$ and $I_2$ are located on a straight line J—J, and potential electrodes $E_1$ and $E_2$, and $E_3$ and $E_4$ are located on a line K—K passing through the electrode $I_1$ and at right angles to the line J—J. The fixed positions defined by the pairs of electrodes $E_1$ and $E_2$, and $E_3$ and $E_4$, are located on opposite sides of the electrode $I_1$, preferably at equal distances therefrom. With this arrangement the measurements involving the potential difference between the electrodes $E_1$ and $E_2$, and between $E_3$ and $E_4$ may be averaged for each of a multiplicity of locations of electrode $I_2$ along the line J—J. Ordinarily no correction factor will be needed to correlate measurements taken when the electrode $I_2$ is in a corresponding location on either side of the electrode $I_1$. The averaged measurements taken with this electrode arrangement are free from errors due to natural earth currents, for the same reasons as pointed out above in connection with the averaged measurements described in connection with Fig. 5. Additional potential electrodes may be placed in the earth at the points marked 73, 74, 75, and 76 and measurements may also be taken which involve the potential differences between the electrodes located at 73 and 74, and at 75 and 76 simultaneously with the other measurements in order to obtain more complete information regarding the geologic nature and characteristics of the subsurface.

Various forms of ratio measurements may be taken, for example, the ratio of the energizing current to the potential created between the electrodes $E_1$ and $E_2$ in Figs. 1 to 4 may be measured in the manner described in my copending application Serial No. 146,781, filed June 7, 1937, now Patent No. 2,137,650, or the ratio of the energizing current to the magnetic or electromagnetic field created by the energizing current at the positions defined by said electrodes may be measured according to said copending application. It will also be appreciated that the ratio of potentials at two or more positions may be measured in the manner described in my copending application Serial No. 144,467, filed May 24, 1937 (Patent No. 2,174,343).

Figure 8:
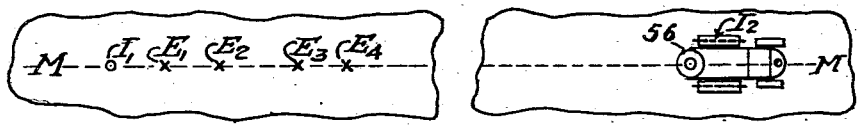
Figure 9:
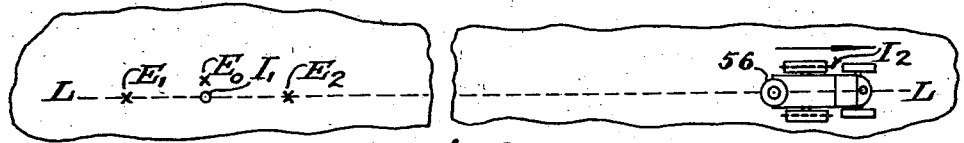
Figure 10:
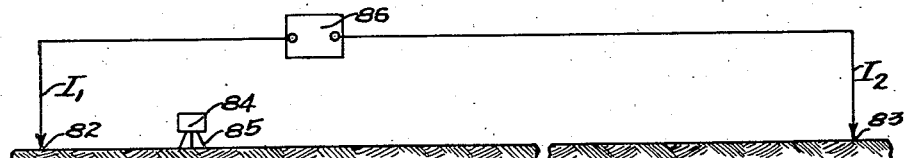
Fig. 10 is a diagrammatic side elevation representative of apparatus arrangements which may be utilized for taking measurements involving magnetic or electromagnetic field strengths.

Referring to Fig. 8, an arrangement is shown in which energizing electrodes $I_1$ and $I_2$ are located on a straight line M—M along with two pairs of potential electrodes $E_1$ and $E_2$, and $E_3$ and $E_4$ located at fixed positions between the energizing electrodes. The energizing electrode $I_1$ may be a stationary electrode and the potential electrodes are preferably located adjacent this electrode. Numerous forms of measurements may be taken with this electrode arrangement for each of the values of separation of the electrodes $I_1$ and $I_2$, for example, the difference between the differences in potential existing between the electrodes $E_1$ and $E_2$, and $E_3$ and $E_4$, the ratio of this value to the energizing current, or the ratio of the two differences in potential existing between these pairs of potential electrodes. In the event that potential measurements are made involving the difference between the differences in potential existing between the two pairs of energizing electrodes, the interval between electrodes of each pair is preferably the same so that the potential difference between electrodes of each pair resulting from natural earth currents is the same, and will be eliminated when one potential difference is subtracted from the other. In the event that one potential difference is divided by the other to obtain the ratio of the potential differences, the resulting error due to natural earth currents will be less in the ratio than in the single potential difference readings and will be substantially minimized if the natural earth potentials are small compared to the potential created by the energizing current.
Referring to Fig. 9 I have shown an electrode arrangement which may be used for taking potential ratio measurements after the manner described in my copending application Serial No. 144,467. This gives important information regarding the angle of penetration of the energizing current as described in greater detail in said last-named application. Fixed potential electrodes $E_1$ and $E_2$ are arranged on opposite sides of a fixed energizing electrode $I_1$ and lie substantially on a line L—L passing through the energizing electrodes $I_1$ and $I_2$. A third potential electrode $E_0$ is shown located closely adjacent the electrode $I_1$ and to one side thereof. Measurements may be made of the potentials existing between $E_0$ and $E_1$ and between $E_0$ and $E_2$ for a multiplicity of different locations of the electrode $I_2$ along the line L—L and during the flow of current between electrodes $I_1$ and $I_2$. The two potential measurements obtained at each location of the electrode $I_2$ may be divided to give a potential ratio measurement, or suitable means may be provided for measuring these potential ratios directly, as shown and described in said copending application Serial No. 144,467.
It is not necessary to locate the reference electrode $E_0$ closely adjacent and to one side of the electrode $I_1$, nor is it necessary to locate the electrodes $E_1$ and $E_2$ on opposite sides of the electrode $I_1$, and various other electrode arrangements for obtaining such ratio measurements are fully described in said copending application and may be employed in the practice of the present invention. The measurement of the ratio of the magnetic or electromagnetic field strengths created at two positions is also described in my copending application Serial No. 144,467 and such ratio measurements may also be employed in practicing the method of this invention.
In Fig. 10 I have illustrated an apparatus arrangement with which measurements involving created magnetic or electromagnetic fields may be taken. Energizing electrodes $I_1$ and $I_2$ are connected to the earth 81 at points designated at 82 and 83. Between the two energizing electrodes I have shown a measuring instrument 84 located at a fixed position 85 on the earth's surface. Electrodes $I_1$ and $I_2$ are suitably connected to a source of current 86 which has suitable means of control and of indicating the magnitude of current. The instument 84 may be of any of the types described in my issued Patents Nos. 1,906,271 and 2,015,401, for measuring the magnetic or electromagnetic field at the position of said instrument created by the flow of current between electrodes $I_1$ and $I_2$. The choice of instrument will depend upon whether the current is direct, alternating or pulsating, and suitable instruments are described in said patents for use with any of said types of current. A series of measurements may be taken, to determine the effect of subsurface variations upon the magnetic or electromagnetic field at the fixed position 85, as the electrode $I_2$ is moved to a multiplicity of different positions.

It will now be apparent that instruments of the type designated at 84 may be located at one or more positions about the energizing electrode $I_1$, for example, at positions such as defined by the pairs of potential electrodes in Figs. 1 through 8, and that the magnetic measurements obtained may be treated in a comparable manner to the potential measurements above described.

Referring to Fig. 14, I have shown a preferred arrangement in which energizing electrodes $I_1$ and $I_2$ and potential electrodes $E_1$ and $E_2$ are assumed, for example, to be located substantially on a single straight line. The energizing electrodes $I_1$ and $I_2$ are connected to a source of power 91 which is provided with suitable controls for adjusting and maintaining a desired flow of current through the earth between these electrodes. The position defined by the electrodes $E_1$ and $E_2$ is shown between the electrodes $I_1$ and $I_2$ and the electrodes $E_1$ and $E_2$ are shown spaced from one another by a substantial distance and symmetrically disposed with respect to the electrodes $I_1$ and $I_2$. A potential measuring or indicating device is connected to the electrodes $E_1$ and $E_2$ and may be conveniently located adjacent the power supply 91. Electrodes $I_1$ and $I_2$ may be mobile electrodes and may be assumed to be moving at the same velocities in the directions indicated by the arrows N and O, respectively to repeatedly vary the spacing between these electrodes.

The distances between the electrodes $I_1$—$E_1$ and $E_2$—$I_2$ may be made equal, for example, at the initial separation of the electrodes $I_1$ and $I_2$ and the interval between the electrodes $E_1$ and $E_2$ may be greater than the above-mentioned distances, and the positions of electrodes $E_1$ and $E_2$ should remain substantially fixed as the electrodes $I_1$ and $I_2$ are moved outwardly to some final value of separation. Thus, if the initial separation of electrodes $I_1$ and $I_2$ is 6,000 feet, the electrodes $E_1$ and $E_2$ may be separated by a distance of 3,000 feet, and this separation of the electrodes $E_1$ and $E_2$ remains substantially the same even though the final separation of electrodes $I_1$ and $I_2$ is 12,000 feet. The electrodes $I_1$ and $I_2$ are not necessarily moved at the same rate and may be moved at different rates; however, the data will usually be more readily interpreted if the electrodes are moved at the same rate. It should also be noted that electrodes $E_1$ and $E_2$ are not necessarily symmetrically located with respect to the electrodes $I_1$ and $I_2$ and that the electrodes $E_1$ and $E_2$ may be located nearer to either one of the electrodes $I_1$ and $I_2$ during a survey. It should also be noted that both of the energizing electrodes may be moved in the same direction, that is, one may be moved toward the position of the potential electrodes and the other may be moved away from the position of the potential electrodes at the same or different rates of movement.

It will now be appreciated that the procedures described in relation to Figs. 1–10 may be modified to include the movements of both energizing electrodes, after the manner described in relation to Fig. 14.

A further modified procedure involving the movement of both the energizing electrodes is illustrated in Fig. 15, in which the energizing electrodes $I_1$ and $I_2$ are connected to the surface of the earth and to a source of current 31. Potential electrodes $E_1$ and $E_2$ are shown located between the electrodes $I_1$ and $I_2$ and connected to a potential indicating device 32. As an example, the potential electrodes $E_1$ and $E_2$ may be spaced from one another by a distance of approximately 3,000 feet while the energizing electrodes may be located at points 1,500 feet outward from the respective potential electrodes. The initial separation of the energizing electrodes is then 6,000 feet and it will be assumed that they are each to be moved outwardly 3,000 feet to give a final separation of 12,000 feet, in which case electrodes $I_1$ and $I_2$ would be located at points 34 and 35 respectively. A second set of potential electrodes $E_3$ and $E_4$ are shown located at points 1,500 feet outward from the points 34 and 35 respectively and connected to a second potential indicating instrument 33. The positions of the electrodes $E_1$, $E_2$, $E_3$, and $E_4$ are maintained fixed and a series of measurements are taken at 32 and 33 as current is passed through the earth between $I_1$ and $I_2$ for the different values of separation thereof.

The electrodes $I_1$ and $I_2$ may either be moved toward or away from one another at the same or different rates, or may be moved in the same direction at the same or different rates. In any case, the positions of the potential electrodes remain fixed as the current is passed through the earth between the energizing electrodes as they are located at successive pairs of spaced points so as to include a multiplicity of different portions of the earth therebetween.

In the examples described in relation to Figs. 1 through 10, 14, and 15, the required measurements may be taken continuously as either one or both of the energizing electrodes are moved, or they may be taken intermittently at the different successive locations of the energizing electrodes. If the measurements are taken intermittently the distance increments between successive locations of an energizing electrode are preferably short, and a distance of fifty feet is ordinarily satisfactory. Great economies in this type of survey may still be realized without the use of the mobile electrode device since the line over which the mobile electrode device travels may be easily divided into a multiplicity of suitable intervals, say thirty, fifty, or one hundred foot intervals, and either one or both of the energizing electrodes in each case may be common stake electrodes. The moving electrode or electrodes would in such cases be moved forward to successive points and driven into the ground at each of these points. The current would then be passed through the earth and the measurements would be taken for each of the successive locations of the electrodes. A survey would thus be accomplished at a great saving in labor, since the potential electrodes would remain stationary for a series of measurements and only one or both of the energizing electrodes would be moved for each measurement.

It should be noted that when using a mobile electrode for a moving energizing electrode a control of the time of current flow may be effected at the different locations of a moving energizing electrode by moving this electrode at a fixed and known rate. By controlling the magnitude as well as the time of current flow at the various locations of a moving energizing electrode, controlled electrochemical effects may be produced. Thus if the current is controlled and varied in a regular predetermined manner, for example, increased directly or as some power of the increasing separation of the energizing electrodes, and the separation of the energizing electrodes is increased at a constant rate, the electrolytic and other electrochemical effects of the current flow will remain substantially constant or will vary in a uniform manner. It should also be noted that if both the energizing electrodes are moved in the same direction at the same rate of speed so as to maintain a constant separation of the energizing electrodes while maintaining the current substantially constant, controlled electrolytic effects may still be obtained.

Figure 11:
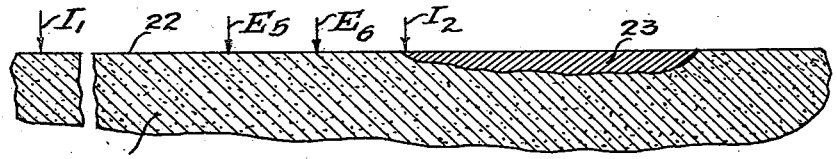
Figs. 11 through 13 are diagrammatic side elevations illustrating a source of error which is present in survey methods in which potential electrodes are moved to different locations on the earth's surface for each measurement.
Figure 12:
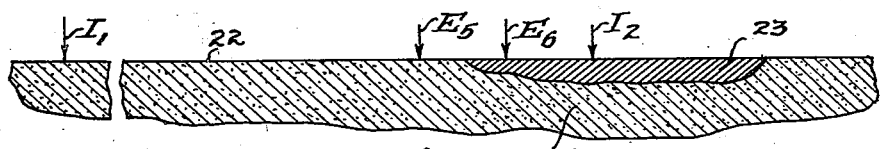
Figure 13:
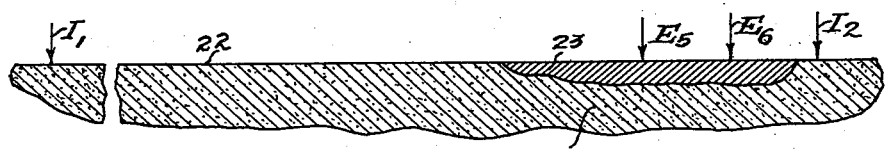

In Figs. 11 to 13 I have illustrated a source of error which is present in all present-day methods of electrical exploration in which one or both of the potential electrodes are moved to a different location on the surface of the earth for each measurement. In Fig. 11 a vertical cross-section of a portion of the earth is indicated at 21 and energizing electrodes $I_1$ and $I_2$ are connected to the earth's surface indicated at 22, and may be considered as separated from one another by a considerable distance. For purposes of illustration it is assumed that potential electrodes $E_5$ and $E_6$ are separated from electrode $I_2$ by a constant distance and from one another by a constant distance and are moved outwardly along with the electrode $I_2$ to increase the distance between $I_1$ and $I_2$.

The portion of the earth indicated at 21 is assumed to be homogeneous except for a near-surface portion 23 which has a relatively high conductivity as compared with the remainder of the portion 21. The electrode $I_2$ is shown in contact with one end of the body 23 and when current is passed through the earth between $I_1$ and $I_2$ a large portion of the current will flow from the side of electrode $I_2$ away from the electrode $I_1$ and through the relatively highly conductive body 23 so that the potential difference measured between $E_5$ and $E_6$ will be relatively small for a given current flowing between $I_1$ and $I_2$.

In Fig. 12 a subsequent position of the electrodes $I_2$, $E_5$, and $E_6$ is shown in which the electrode $I_2$ is located somewhat nearer the central portion of the body 23 and the electrode $E_6$ is in contact with one edge of the body at a position corresponding in general with the position of the electrode $I_2$ in Fig. 2. The electrode $E_5$ occupies a position at which it is in contact with the portion 21 of the earth which is of relatively high resistance compared to the portion 23. The potential difference between the electrodes $E_5$ and $E_6$ will be relatively high for the value of current flowing through the earth between the electrodes $I_1$ and $I_2$ which corresponds to the value utilized in Fig. 10. The relatively highly conductive body 23 tends to make the potential of the electrode $E_6$ approach the potential of the electrode $I_2$ while the potential of the electrode $E_5$ will not be changed proportionately.

Another position of the electrodes $E_5$, $E_6$, and $I_2$ is illustrated in Fig. 13 and in this case both the electrodes $E_5$ and $E_6$ occupy positions above the conductive body 23. The potential difference between the electrodes $E_5$ and $E_6$ for a given value of current passing between the electrodes $I_1$ and $I_2$ will be less than for the cases illustrated in Figs. 10 and 11, since the electrodes $E_5$ and $E_6$ are both in contact with the relatively highly conducting body 23.

The method of this invention eliminates this large and variable source of error by maintaining the potential electrodes fixed while passing the current successively between different ones of a plurality of points located at different relative positions with respect to the potential electrodes. The near-surface conditions then remain constant throughout a series of measurements and even though the near-surface conditions adjacent any position exert a great influence on the measurements obtained, this influence will remain relatively constant throughout a series of measurements, and the changes in the subsurface structure at relatively great depths may therefore be determined by the changes in the measurements so obtained.

Referring to Figs. 16 and 17, I have shown an example of a demountable or detachable contact element for use on one or more of the pneumatic-tired wheels of a mobile electrode device, the metallic contact rim 64, having earth-engaging protuberances or projections 65, being shown as comprising an annular channel whose side walls are indicated at 64a and 64b and which are adapted to embrace a portion of the side walls of a pneumatic tire 63a. The distance between the walls 64a and 64b is preferably less than the normal inflated width of the tire 63a so that upon inflation of the tire the side walls thereof will be held firmly by the walls 64a and 64b and tread portion 63b of the tire will rest in firm frictional engagement with bottom wall 64c of the rim 64. The rim on the wheel 63 for holding the tire 63a is designated at 63c. The rim 64 may be placed on the tire 63a by deflating the tire and forcing the rim in place thereover. The tire may then be inflated to hold the rim in position around the periphery of the pneumatic tire as shown in Fig. 17. The rim may be removed in the same manner when it is desired to use the tractor for other purposes. A flexible connector is shown at 66 for effecting electrical connection between the rim 64 and the wheel 63 which is in electrical connection with the frame of the tractor. The conductor 55 may be connected to the tractor frame. It is apparent that the annular contact member 64 may be made in a plurality of sections which may be fastened together about the tire 63a without first deflating the tire or that other means may be employed for detachably securing the annular contact member to the wheel and around the periphery of the pneumatic tire. Other modifications of the device are believed apparent.

In each of the above-described modifications of my invention, measurements may be taken involving the value of the created quantity. In some cases the value of the current may be recorded separately with each measurement or may be included as a part of the measurement. In each of the above cases the current may be held constant or may be varied in a regular and predetermined manner, for example, so as to increase the current with increasing separations of the energizing electrodes or so as to maintain a constant or regularly varying value of a created quantity such as potential difference or the magnetic field strength at a fixed position. In any event a series of measurements will be taken involving the value of a created quantity at a fixed position while the current is flowing in successive paths through the earth between energizing electrodes, said measurements being indicative of the effect of variations in the subsurface upon the value of the created quantity at the fixed position as the path of the current is varied.

According to a preferred procedure, I provide means for directly measuring the relation between the current in the energizing circuit and the potential between a pair of potential electrodes, while the current is maintained approximately constant or is varied in any manner. Such measurements may be obtained with an apparatus in which the potential and energizing circuits are electrically and electrostatically isolated from one another. Apparatus of this general type which are adapted for use with alternating and direct currents are described in my copending applications Serial Nos. 146,781, filed June 7, 1937 (Patent No. 2,137,650), and 162,635, filed September 7, 1937.

A form of apparatus which I have found to be advantageous for this purpose, and which is particularly useful with direct current or with very low frequency alternating current, comprises a substantially constant frequency oscillator including an electron discharge device for controlling the amplitude of oscillation of the oscillatory circuit. A rectifier circuit is associated with the oscillatory circuit for producing a rectified potential which may be impressed across the potential electrodes in opposition to the potential across said electrodes created by the energizing current, and a galvanometer may be included in this circuit for indicating when the rectified and created potentials are equal, or other equivalent means may be utilized to compare the value of the two potentials. The constants of the oscillatory circuit are preferably such that the discharge device is responsive to the value of the energizing current and is adapted to increase the amplitude of oscillation of the oscillatory circuit with an increase in energizing current, to produce an increase in the value of the rectified potential. Thus the rectified potential will vary directly with the value of the energizing current, that is, will increase with increasing values of energizing current.

The apparatus comprises means for adjusting the value of the rectified potential to make this potential equal to the created potential in order to obtain a balance between these potentials. The amount of adjustment required to balance these potentials may be used as an indication of the departure of the relation of the energizing current to the created potential, from the relation that would be obtained in a homogeneous medium.

The adjustment may be obtained by varying the amplitude of oscillation of the oscillatory circuit through varying the response of the discharge device to the energizing current, or by varying the magnitude of the rectified potential without changing the amplitude of oscillation of the oscillatory circuit.

An apparatus of the type above described is illustrated in Fig. 18. The energizing current from a source of current 41 passes through a conductor 41a and through a resistor 42 having a variable tap switch 43 for various ranges of current value and then to one energizing electrode through a conductor 41b. A conductor 41c connects the other side of the source of current 41 to the other energizing electrode. The oscillatory circuit comprises a transformer 45 provided with plate and grid windings 46 and 47 disposed in inductive relation to one another, and an electron discharge device 48 such as a vacuum triode. The plate cathode circuit of the discharge device 48 comprises the plate winding 46, the movable arm 49 of the potentiometer 44, and a source of plate potential 50. The grid cathode circuit comprises the grid winding 47 and a grid-leak and condenser indicated at 51 and 51a. Oscillations may be initiated by closing a key 48a in the plate cathode circuit. It may be seen that the potentiometer 44 is included in the plate cathode circuit of the discharge device so that the amplitude of oscillation of the oscillatory circuit will be either increased or decreased with increasing or decreasing voltages across the potentiometer 44. The transformer 45 is provided with a third or output winding 51b, which is connected to a rectifier 52, and a potentiometer 52a is connected across the output of the rectifier 52. A reversing potentiometer 57 is connected between a variable tap 52b on the potentiometer 52a and a terminal 59 which may be connected to one potential electrode. Another terminal 58, which may be connected to the other potential electrode, is connected to the other side of the potentiometer 52a through a series circuit including a null point galvanometer 53 and a circuit protecting resistor 54 provided with a shunt key 55. A reversing switch is provided at 56 to reverse the polarity of the rectified output. The reversing potentiometer 57 serves to neutralize any natural or galvanic potential which may exist across the potential electrodes connected to the terminals 58 and 59, and to neutralize the rectified potential created across the resistor 52a by the oscillation of the discharge device at zero current flow in the energizing circuit, since it is not practical to have the tube circuit adjusted for zero amplitude at zero current flow. The circuit is therefore adjusted for low amplitude at zero current flow. The circuit is therefore adjusted for low amplitude oscillations at zero energizing current flow, and the potential created by these low amplitude oscillations is neutralized by the potentiometer 57 at the same time the earth potentials are neutralized.

By use of proper circuit constants, well known to the art, a substantially linear relationship may be obtained between the additional potential applied to the plate of the discharge device by the voltage drop across the potentiometer 44, and the rectified potential created across the terminals 58 and 59. With such linear relationship, the variations in current in the energizing circuit will introduce a compensating variation in the rectified potential impressed across the terminals 58 and 59. The apparatus may then be used for measuring the relation of the potential drop created across the potential electrodes by the energizing current, to the value of the energizing current, by noting the position of the movable arm 49 of the potentiometer 44 required to give a null reading of the galvanometer 53.

Adjustments of the potentiometer 44 will vary the value of the rectified potential by changing the amplitude of oscillation of the oscillatory circuit, while changing the position of the tap 52b of the potentiometer 52a will also change the value of the rectified potential applied between the terminals 58 and 59, but without changing the amplitude of oscillation of the oscillatory circuit. It will be seen then that either the potentiometer 44 or the potentiometer 52a may be calibrated to give the value of the required relation. It will be apparent that other forms of adjustment may be used to make the rectified potential equal to the created potential and that various other forms of oscillatory circuits may be used without departing from the spirit of this invention.

The above described apparatus operates to create two opposing potential differences in the circuit connected to the terminals 58 and 59, this circuit being completely isolated electrically from the energizing circuit. One of these opposing potential differences is proportional to the rectified potential at rectifier 52, and may be either equal to said rectified potential or a variable proportion thereof dependent upon whether the potentiometer 52a is employed for adjustment. This one potential difference is, therefore, also proportional to the oscillating potential in the oscillatory circuit above described and consequently, is proportional to the current in the energizing circuit including conductors 41a and 41b. The other potential difference in the circuit connected to terminals 51a and 51b is proportional to the potential difference between the two potential electrodes to which said terminals are connected. In the particular arrangement shown, this other potential difference is equal to the potential difference between said potential electrodes, but it will be obvious from the above description that a properly calibrated potentiometer may be included in this circuit so that the potential so maintained will be a variable proportion of the potential difference between the potential electrodes, and that adjustment of this potentiometer may be employed as a means of so adjusting the relative values of the two opposing potentials as to obtain a null reading on galvanometer 53.

Various forms of electric circuit arrangements may be employed for producing a potential difference proportional to the energizing current, for balancing against a potential difference proportional to the potential difference between the potential electrodes. For example, I may provide means for varying the frequency of oscillation in an oscillatory circuit in proportion to the potential difference created across a resistance in the energizing circuit, and for rectifying the oscillating current so produced, whereby the rectified potential difference so produced is caused to vary with variations in the energizing current, as described more fully in my copending application Serial No. 162,635.

In any case, the apparatus comprises electrical means associated with the energizing circuit, such as the oscillatory circuit and rectifying means above described, and conductor means connected with the potential electrodes either directly or through a potentiometer as above suggested, for creating the aforementioned two opposing potentials in the circuit of the galvanometer 53, which serves as a means for indicating when these two opposing potentials are equal, and means are provided at some point in one of the circuits for adjusting the value of one of these opposing potentials and calibrated to indicate directly the ratio between the current in the energizing circuit and the potential between the potential electrodes when said opposing potentials are balanced as indicated by the null reading of the galvanometer.

The same type of measuring apparatus may be employed for taking ratio measurements when alternating current is employed for energizing the ground, it being only necessary in such cases to properly adapt the apparatus for use with alternating current instead of direct current as, for example, by using suitable means for rectifying the potential created between the potential electrodes, whereby this rectified potential may be balanced against a rectified potential proportional to the energizing current.

I claim:

1. The method of electrical exploration of the subsurface which comprises: passing an electric current through the earth between a pair of energizing electrodes spaced a known distance from one another along the earth's surface, so as to create a quantity at a fixed position on the earth's surface; repeatedly changing the position of at least one of said electrodes and passing current between said electrodes so as to repeatedly vary the path of the current and create a multiplicity of successive values of said quantity at said fixed position; and taking a multiplicity of measurements, while said current is flowing through the successive paths, indicative of the effect of variations in the subsurface upon the value of said created quantity at said fixed position as the path of current is so varied.

2. The method of electrical exploration of the subsurface which comprises: passing an electric current through the earth between a pair of energizing electrodes spaced a known distance from one another along the earth's surface, so as to create a quantity at a fixed position on the earth's surface intermediate said two electrodes and substantially on a straight line passing through said electrodes; moving both of said electrodes along said line to vary the distance therebetween and passing current between said electrodes so as to cause the current to flow through paths of different depths and create successive values of said quantity at said fixed position; and taking a series of measurements, while said current is flowing through the successive paths, indicative of the effect of variations in the subsurface upon the value of said created quantity at said fixed position as the path of current is so varied.

3. The method of electrical exploration of the subsurface which comprises: passing an electric current through the earth between a pair of energizing electrodes spaced a known distance from one another along the earth's surface, so as to create a quantity at a fixed position on the earth's surface; successively changing the position of one of said electrodes while maintaining the other of said electrodes substantially fixed and passing current between said electrodes so as to successively vary the path of the current and create successive values of said quantity at said fixed position; and taking a series of measurements, while said current is flowing through the successive paths, indicative of the effect of variations in the subsurface upon the value of said created quantity at said fixed position as the path of current is so varied.

4. The method of electrical exploration of the subsurface which comprises: passing an electric current through the earth between a pair of energizing electrodes spaced a known distance from one another along the earth's surface, so as to create a quantity at a fixed position on the earth's surface having a predetermined relation to the position of one of said electrodes; moving the other of said electrodes to different positions substantially along a straight line passing through said electrodes while maintaining said one electrode substantially fixed and passing current between said electrodes so as to cause said current to flow through paths of different depths and create successive values of said quantity at said fixed position; and taking a series of measurements, while said current is flowing through the successive paths, indicative of the effect of variations in the subsurface upon the value of said created quantity at said fixed position as the path of current is so varied.

5. The method of electrical exploration of the subsurface which comprises: passing an electric current through the earth between a pair of energizing electrodes spaced a known distance from one another along the earth's surface, so as to create a quantity at a fixed position on the earth's surface; repeatedly changing the position of at least one of said electrodes and passing current between said electrodes so as to repeatedly vary the path of the current and create successive values of said quantity at said fixed position; and taking a series of measurements, while said current is flowing through the successive paths, indicative of variations in the relative values of the current passed through the earth and said created quantity at said fixed position as the path of current is so varied.

6. The method of electrical exploration of the subsurface which comprises: passing an electric current through the earth between a pair of energizing electrodes spaced a known distance from one another along the earth's surface, so as to create a quantity at a fixed position on the earth's surface; repeatedly changing the position of at least one of said electrodes and passing current between said electrodes so as to repeatedly vary the path of the current and create successive values of said quantity at said fixed position, the magnitude of the current passed through each of the successive current paths and the magnitude of said quantity at said fixed position constituting two measurable quantities whose relative values are dependent upon the path of said current and the electrical properties of the earth traversed by said current, and upon the location of said fixed position relative to said current path; and measuring one of said measurable quantities while the other of said measurable quantities as a known value as said current is flowing through said successive paths.

7. The method of electrical exploration of the subsurface which comprises: passing an electric current through the earth between a pair of energizing electrodes spaced a known distance from one another along the earth's surface, so as to create a quantity at a fixed position on the earth's surface; repeatedly changing the position of at least one of said electrodes and passing current between said electrodes so as to repeatedly vary the path of the current and create successive values of said quantity at said fixed position, the magnitude of the current passed through each of the successive current paths and the magnitude of said quantity at said fixed position constituting two measurable quantities whose relative values are dependent upon the path of said current and the electrical properties of the earth traversed by said current, and upon the location of said fixed position relative to said current path; and measuring one of said measurable quantities while the other of said measurable quantities has a constant value for each of the successive paths of current flow.

8. The method of electrical exploration of the subsurface which comprises: passing an electric current through the earth between a pair of energizing electrodes spaced a known distance from one another along the earth's surface, so as to create a quantity at a fixed position on the earth's surface; repeatedly changing the position of at least one of said electrodes and passing current between said electrodes so as to repeatedly vary the path of the current and create successive values of said quantity at said fixed position; and taking a series of measurements, while said current is flowing through the successive paths, of the ratio between the current passed through the earth and said created quantity at said fixed position as the path of current is so varied.

9. The method of electrical exploration of the subsurface which comprises: passing an electric current through the earth between a pair of energizing electrodes spaced a known distance from one another along the earth's surface, so as to create a potential difference at a fixed position on the earth's surface; repeatedly changing the position of at least one of said electrodes and passing current between said electrodes so as to repeatedly vary the path of the current and create a multiplicity of successive values of said potential difference at said fixed position; and taking a multiplicity of measurements, while said current is flowing through the successive paths, indicative of variations in the relative values of the current passed through the earth and said potential difference at said fixed position as the path of current is so varied.

10. The method of electrical exploration of the subsurface which comprises: passing an electric current through the earth between a pair of energizing electrodes spaced a known distance from one another along the earth's surface, so as to create a magnetic field at a fixed position on the earth's surface; repeatedly changing the position of at least one of said electrodes and passing current between said electrodes so as to repeatedly vary the path of the current and create a multiplicity of successive values of said magnetic field at said fixed position; and taking a multiplicity of measurements, while said current is flowing through the successive paths, indicative of variations in the relative values of the current passed through the earth and said magnetic field at said fixed position as the path of current is so varied.

11. The method of electrical exploration of the subsurface which comprises: passing an electric current through the earth between a pair of energizing electrodes spaced a known distance from one another along the earth's surface, so as to create a potential difference at each of two fixed positions on the earth's surface adjacent one of said energizing electrodes; successively changing the position of the other of said electrodes and passing current between said electrodes so as to successively vary the path of the current and create successive values of potential difference at said fixed positions while maintaining said one electrode substantially fixed, and taking a series of measurements, while said current is flowing through the successive paths, dependent upon the values of said two potentials for each position of said other energizing electrode.

12. The method set forth in claim 11, in which said fixed positions are located adjacent and on opposite sides of said one energizing electrode.

13. The method set forth in claim 11, in which said fixed positions are located adjacent and on the same side of said one energizing electrode.

14. A method of determining the geologic nature and characteristics of the subsurface, which comprises: passing an electric current in a path through the earth between a pair of spaced electrodes having a known spacial arrangement on the surface of the earth; changing the spacial arrangement of one of said electrodes and maintaining the other of said electrodes in a fixed position while passing current therebetween at different spacial arrangements thereof so as to vary the angle of penetration of the mean path of said current with respect to the surface of the earth and produce corresponding variations in the ratio between the values, at two fixed positions adjacent said one electrode located at a fixed position, of an electrical variable created by the flow of said current and influenced by said variations in angle of penetration; and determining variations in said ratio for the different spacial arrangements of said one electrode.

15. An apparatus for determining the ratio between the electric current in an energizing circuit and the potential difference between two electrodes, which comprises: an oscillatory circuit associated with said energizing circuit and including an electron discharge device for controlling the amplitude of oscillation of said circuit, said discharge device being responsive to variations in the current in said circuit so as to cause said amplitude of oscillation to vary directly with said variations in current; rectifier means associated with said oscillatory circuit for producing a rectified potential which varies directly with said amplitude of oscillation; another circuit associated with said rectifier means and with said electrodes in such manner as to produce in said other circuit two opposing potentials, one proportional to said rectified potential and the other proportional to the potential between said electrodes; calibrated means for adjusting the value of one of said opposing potentials; and means included in said other circuit for indicating when said opposing potential differences are equal to one another.

JOHN JAY JAKOSKY.

CERTIFICATE OF CORRECTION.

Patent No. 2,192,404.                                             March 5, 1940.

JOHN JAY JAKOSKY.

It is hereby certified that error appears in the printed specification of the above numbered patent requiring correction as follows: Page 9, second column, line 40, claim 6, for the word "as" read has; and that the said Letters Patent should be read with this correction therein that the same may conform to the record of the case in the Patent Office.

Signed and sealed this 16th day of April, A. D. 1940.

(Seal)                                                           Leslie Frazer
                                                       Acting Commissioner of Patents.